(No Model.) 2 Sheets—Sheet 1.

S. H. HARRINGTON.
CAR COUPLING.

No. 405,256. Patented June 18, 1889.

Attest:
O. B. Morris
Joshua Mattack, Jr.

Inventor:
Samuel H. Harrington
by his attorney
Francis T. Chambers (No Model.)  2 Sheets—Sheet 2.

S. H. HARRINGTON.
CAR COUPLING.

No. 405,256. Patented June 18, 1889.

Attest:
O. B. Morris
Joshua Matlack, Jr.

Inventor:
Samuel H. Harrington
by his attorney
Francis T. Chambers

UNITED STATES PATENT OFFICE.

SAMUEL H. HARRINGTON, OF COLUMBUS, OHIO.

CAR-COUPLING.

SPECIFICATION forming part of Letters Patent No. 405,256, dated June 18, 1889.

Application filed January 30, 1888. Renewed December 1, 1888. Serial No. 292,439. (No model.)

*To all whom it may concern:*

Be it known that I, SAMUEL H. HARRINGTON, of Columbus, county of Franklin, State of Ohio, have invented a new and useful Improvement in Car-Couplings, of which the following is a true and exact description, reference being had to the accompanying drawings, which form a part of this specification.

My invention relates to that class of car-couplings known as "vertical-hook couplings," and in which the coupling is made up of a coupling-head and a rotating coupling nose or knuckle pivoted in said head.

In couplings of the above kind some trouble has heretofore been experienced, owing to the fact that the latch used to lock the coupling-nose in place and the arm of the nose which it engages wear each other away, so that in time the coupling-nose is not locked in the correct angular position, but is free to turn out to a greater or less extent beyond such correct position. Another drawback in the use of this kind of coupling is, that the locking-arm of the coupling-nose has heretofore, as a rule, occupied too much space within the head, and in cases where, as in the Janney coupler, this locking-arm swung out between the two arms of the coupling-head when the nose or knuckle was open, it interfered with the freedom of the nose to turn inwardly, and interfered more or less with the use of certain supplemental coupling devices which I design to use.

The object of my invention is, in the first place, to provide a reversible double latch, so that when the wear on one portion of the latch and the locking-arm has been so great as to materially affect the position of the coupling-nose the defect can be corrected by simply turning the latch around and using its other end; second, to provide the coupling-nose with a yielding arm or spring which will turn into the space between the two arms of the coupling-head when the nose is open, and thus be in position to assist in closing the nose when coupling with another head of similar construction, but at the same time be capable of yielding and being pushed out of the way without moving the coupling-nose to which it is attached, and, lastly, in certain combinations and arrangements of mechanism which I have found advantageous, and which will be hereinafter fully described.

Figure 1:
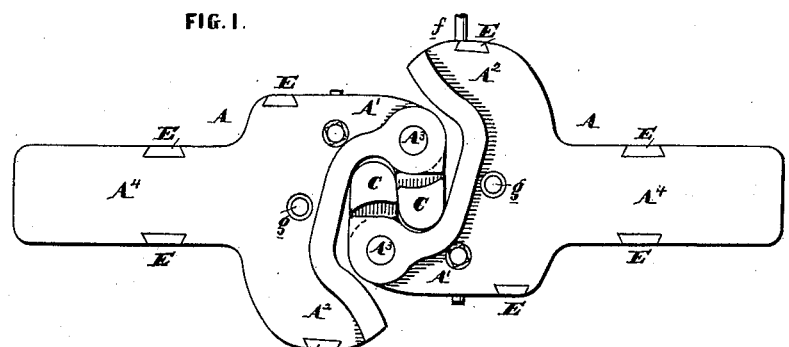
Figure 2:
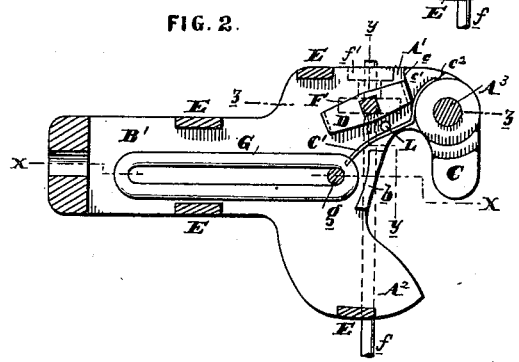
Figure 3:
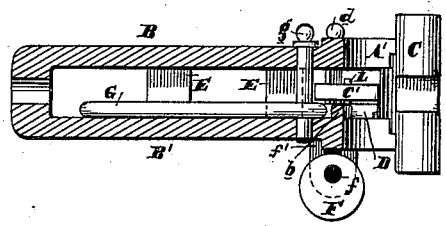
Figure 10:
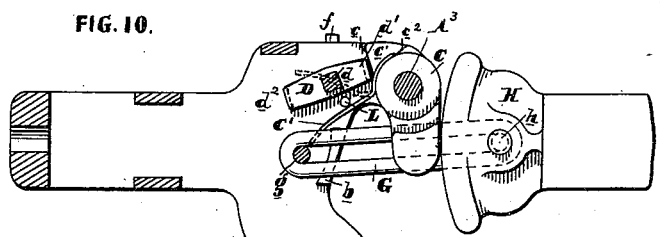
Figure 4:
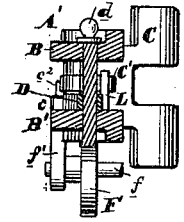
Figure 5:
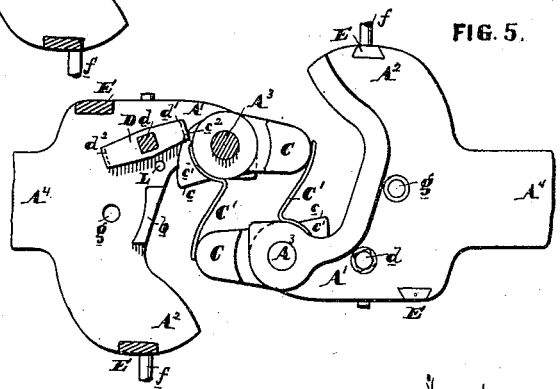
Figure 7:
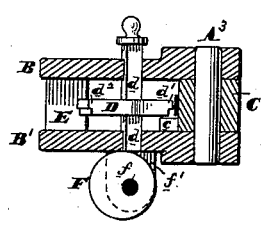
Figure 8:
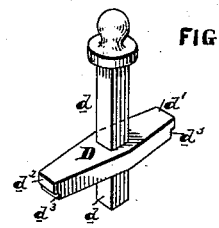
Figure 6:
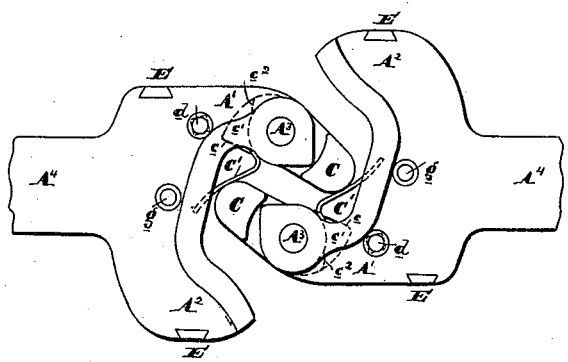
Figure 9:
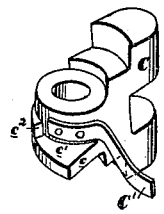

Reference being now had to the drawings which illustrate my invention, Figure 1 is a view of two of my improved couplings as they appear when engaged with each other; Fig. 2, a plan view of my improved coupling with the upper plate removed; Fig. 3, a section through the coupling on the line $x\ x$ of Fig. 2; Fig. 4, a section through the coupling on the line indicated by $y\ y$, Fig. 2; Fig. 5, a view of two of my couplings as they appear when coming together with both noses open; Fig. 6, a view of two couplings in the act of coupling with each other; Fig. 7, a section on the line $z\ z$ of Fig. 2; Fig. 8, a perspective view of my improved latch; Fig. 9, a perspective view of the coupling nose or knuckle provided with the yielding arm or spring; Fig. 10, a plan view of my improved coupler engaged with an ordinary link-and-pin coupling-head, and Fig. 11 a view showing a coupler partially constructed in accordance with my present invention in the act of engaging with the hook of the well-known Miller coupling.

A indicates my improved coupling-head, having in front an arm A', in which the coupling-nose is pivoted, and which I will call the "pivot-arm," and an arm $A^2$, which acts as a guard-arm, and will be referred to by that name. Said head is also continued backward in the form of the shank $A^4$.

I prefer to make the coupling-head in the form of two plates B B', Fig. 3, connected together only on their outer edges by stays E, which not only unite but hold said plates in correct relative position. On the pin $A^3$ in the end of the arm A' the coupling nose or knuckle C is pivoted.

$c$ is a locking-arm, which extends from the hub or boss of the coupling-arm C in a direction substantially opposite to that of the coupling-nose proper. It is, as is shown in the drawings, of less depth than the boss from which it extends, its upper surface being indicated by the letter $c'$, on the back end of which a stop-lug (indicated by the letter $c^2$) projects from the boss.

C' is a spring, which is so secured to the knuckle C that it will, when the knuckle is open, as in Fig. 5, extend out between the arms A' and A² of the head, so as to lie in the path of the coupling-nose of another coupling as it enters this space.

D is my improved latch, which is secured upon a square pin $d$, and has two arms $d'$ $d^2$ extending on opposite sides of this pin. The pin $d$ is secured in square holes made opposite to each other in the two plates B and B'. The shape of the pin and the holes in which it rests prevents it from turning, but permits it to move up and down without turning. The two arms $d'$ and $d^2$ of the latch D are made of unequal length, the shorter one $d'$ being of the correct length to engage the arm $c$ of coupling-nose C when the coupling is new. When, after use, the face of the locking-arms $c$ and the end $d'$ of the latch have become worn beyond a certain point, the pin $d$ is knocked out and the latch D turned around so that its end $d^2$ will become the locking end. The pin $d$ is then reinserted, and if the difference in length between the arms $d'$ and $d^2$ has been correctly adjusted the coupling-nose will again assume the correct angular position.

The action of the latch in connection with the knuckle or nose is best illustrated by Figs. 2, 5, and 7, Fig. 2 representing the latch as engaged with the locking-arm $c$, so as to lock the knuckle C closed; Fig. 7 representing the latch as raised, so as to disengage the locking-arm $c$, and Fig. 5 showing the nose C fully opened and the stop-lug $c^2$ in contact with the end of the latch D.

The construction of the coupling-nose and its latch forms no part of my present invention, except so far as the double character of the latch above described is concerned; but so far as the same are new they are described and claimed in another application for Letters Patent which I filed in the United States Patent Office January 25, 1888, said application having received the serial number 261,502.

L is a stop arranged between the plates B B' in such a position that the spring C' will come in contact with it as the knuckle C is closed and before it has been locked, the result of this being that the said spring is deflected and will act to open the knuckle C as soon as the locking-arm $c$ and its latch D are disengaged. As shown in the drawings, this stop L consists of a pin projecting upward from the lower plate B' of the head. Obviously, however, it could be as well secured to the upper plate B or to both plates.

Figure 11:
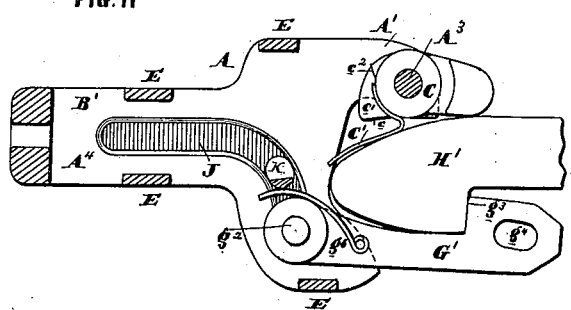

G, Figs. 2, 3, and 10, and G', Fig. 11, are retractible supplementary coupling devices, so secured in the space between plates B B' that while normally lying entirely between said plates they can be at will drawn forward between the arms A' A² without losing their connection with the coupling-head. Thus in the case of G, which is an ordinary coupling-link, a pin $g$ serves to connect it with the coupling-head, while permitting it to move forward, as described, while with G', which has a head provided with the hooked edge $g^3$ and perforation $g^4$, the connection with the coupling-head A is secured by means of pins $g^2$, attached to the rear end of the device G and engaged in grooves J, formed in the shank A⁴ of the coupling-head. In the construction shown in Fig. 11 the supplemental coupling device G', when drawn back within the shank A⁴ of the coupling-head A and thrown over into the arm A' thereof, serves as a latch to engage the locking-arm $c$ of the coupling-nose C.

The construction of the coupling-head in the way described, so that it can contain and permit the operation of the retractible supplementary coupling device, and the arrangement of such supplementary coupling device as shown in Fig. 11, form no part of the present invention, but are a part of my invention as claimed in my other application above mentioned. The only purpose for which they are here referred to is to illustrate the advantages of the spring-arm C', which, from its yielding character, can be pushed out of the way, as is shown in Fig. 11, thus rendering it possible to make a coupling which would be impracticable were the spring C' replaced by a rigid lever-arm.

$b$ is an upwardly-extending lug formed on the inside of the lower plate B' of the head A, and directly in front of the position which the retractible coupling device occupies within the head. Its function is to serve as a stop to prevent the retractible coupling device from being thrown forward by jars or shocks.

F is a cam secured beneath the pin $d$ of the latch D. It is secured on a shaft $f$, so that when rotated it will press against the lower end of the pin $d$ and lift the latch D, as in Fig. 7.

Having now described my invention, what I claim as new, and desire to secure by Letters Patent, is—

1. In combination with a coupling-head having a pivot-arm and a guard-arm, a coupling nose or knuckle pivoted in said pivot-arm and having a locking-arm extending from its hub or boss in a direction substantially opposite to the nose proper, a latch arranged to engage the locking-arm, and a spring-arm secured to the coupling-nose, so that it will extend into the space between the pivot and guard arms when said nose is open.

2. In combination with a coupling-head having a pivot-arm and a guard-arm, a coupling nose or knuckle pivoted in said pivot-arm and having a locking-arm extending from its hub or boss in a direction substantially opposite to the nose proper, and a reversible double latch having arms of unequal length, either of which can be made to engage the locking-arm of the coupling-nose.

3. In combination with a coupling-head having a pivot-arm and a guard-arm, a coupling nose or knuckle pivoted in said pivot-arm and having a locking-arm extending from its hub or boss in a direction substantially opposite to the nose proper, a reversible double latch having arms of unequal length, either of which can be made to engage the locking-arm of the coupling-nose, and a spring-arm secured to the coupling-nose, so that it will extend into the space between the pivot and guard arms when said nose is open.

4. In combination with a coupling-head having a pivot-arm and a guard-arm, a coupling nose or knuckle pivoted in said pivot-arm and having a locking-arm extending from its hub or boss in a direction substantially opposite to the nose proper, a latch arranged to engage the locking-arm, a spring-arm secured to the coupling-nose, so that it will extend into the space between the pivot and guard arms when said nose is open, and a stop secured in the coupling-head, so as to engage and deflect the spring as the coupling-nose is closed.

5. In combination with a coupling-head having a pivot-arm and a guard-arm and made up of two plates B B', secured together and at a proper distance apart by stays arranged on the outer edges of said plates, so as to leave the space between said plates open and unobstructed in front, a coupling nose or knuckle pivoted in said pivot-arm and having a locking-arm extending from its hub or boss in a direction substantially opposite to that of the nose proper, a latch arranged to engage said locking-arm, a spring secured to said coupling-nose, so as to extend out into the space between the pivot and guard arms when the knuckle is open, and a retractible supplementary coupling device secured in the hollow space between the plates B B', so that it can be drawn out between the arms of the head.

6. In combination with a coupling-head having a pivot-arm and a guard-arm and made up of two plates B B', secured together and at a proper distance apart by stays arranged on the outer edges of said plates, so as to leave the space between said plates open and unobstructed in front, a coupling nose or knuckle pivoted in said pivot-arm and having a locking-arm extending from its hub or boss in a direction substantially opposite to that of the nose proper, a latch arranged to engage said locking-arm, a spring secured to said coupling-nose, so as to extend out into the space between the pivot and guard arms when the knuckle is open, a retractible supplementary coupling device secured in the hollow space between the plates B B', so that it can be drawn out between the arms of the head, and a stop on the front edge of the lower plate.

SAMUEL H. HARRINGTON.

Witnesses:
 EVAN DAVIES,
 JOSEPH A. OSBORNE.